UNITED STATES PATENT OFFICE.

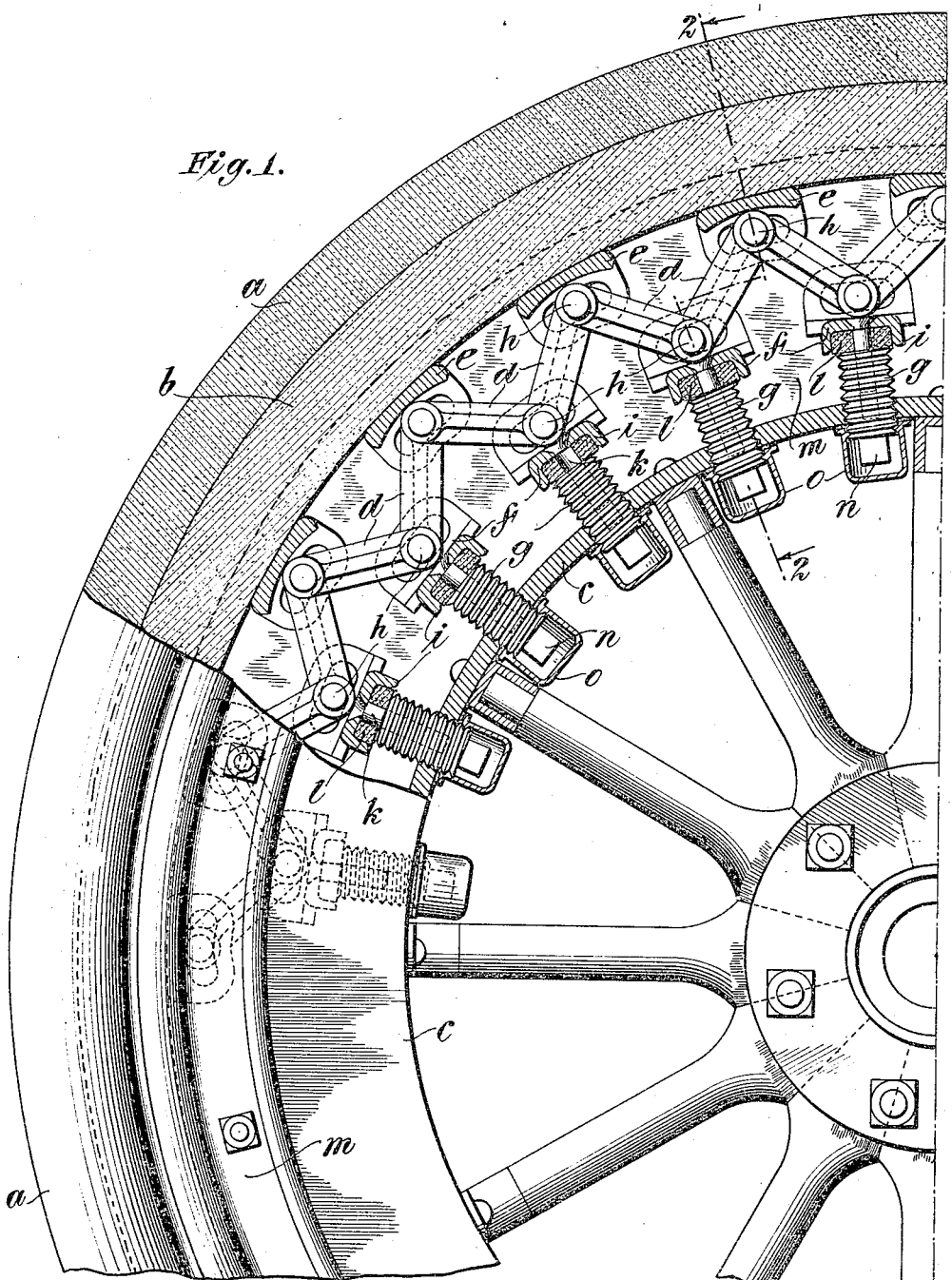

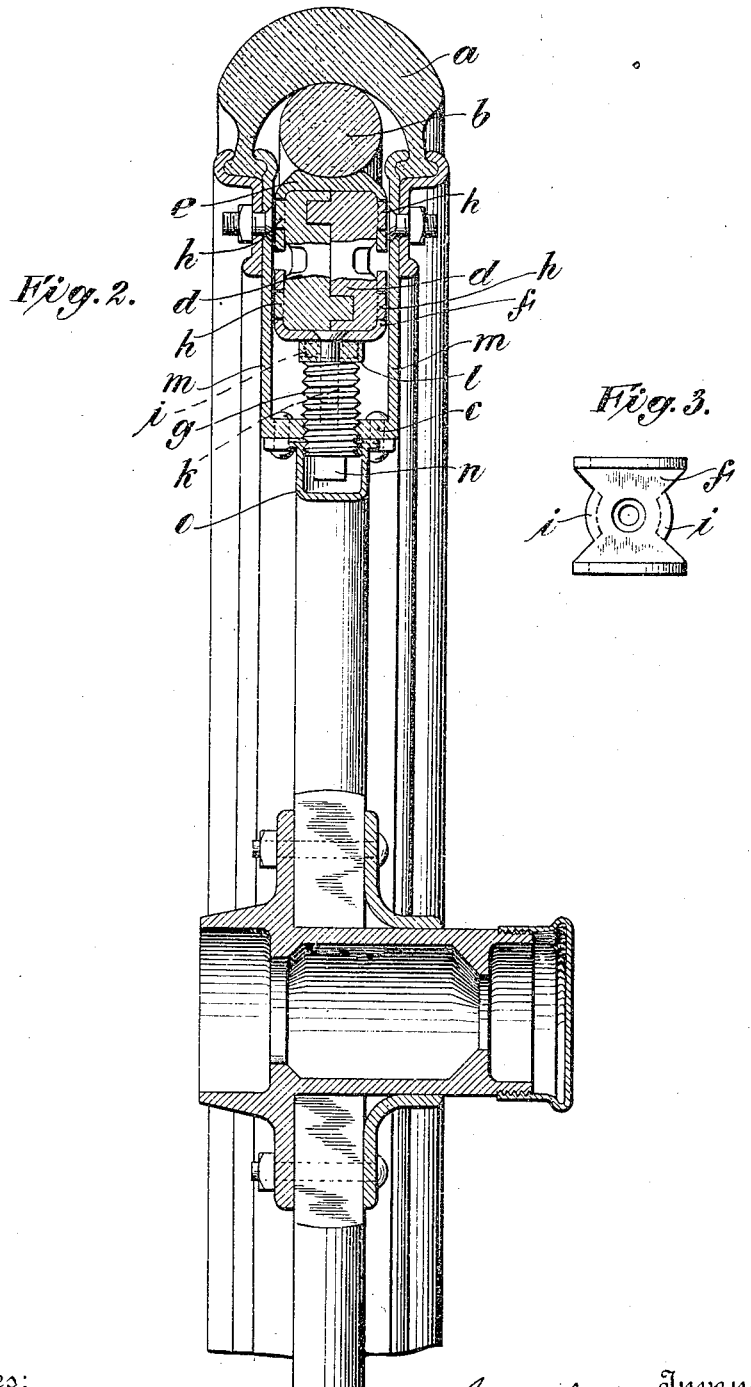

JAMES J. ADAMSEN, OF BROOKLYN, NEW YORK.

WHEEL.

1,017,363.

Specification of Letters Patent.   Patented Feb. 13, 1912.

Application filed May 15, 1911. Serial No. 627,182.

*To all whom it may concern:*

Be it known that I, JAMES J. ADAMSEN, a subject of the King of Norway, residing in the borough of Brooklyn, county of Kings, State of New York, have invented an Improvement in Wheels, of which the following description, in connection with the accompanying drawings, is a specification, like letters on the drawings representing like parts.

The object of the invention is to provide a mechanical device to be applied to the rims of wheels for the purpose of performing the functions of a pneumatic tire, that is, a device which will provide the cushioning effect of a pneumatic tire and will not be subject to the common defects of pneumatic tires, such as puncturing, etc.

The invention will be described in connection with the accompanying drawings in which—

Figure 1 is a view partly in side elevation and partly in section of a sufficient portion of a wheel embodying the improvements to enable the latter to be understood. Fig. 2 is a view of the same in transverse section, the plane of this section being indicated by the line 2—2 in Fig. 1, and, Fig. 3 is a plan view of a forging which may be employed in carrying out the invention.

It will be understood that the improvements may be applied to any form of wheel, a common form of automobile wheel being selected for purposes of illustration and explanation herein. In any form which the improvements may assume, there will be an outer shoe which constitutes the tread and while this may assume various forms, it is shown herein as consisting of an outer tread member $a$, preferably of rubber with interposed plies of fabric and an inner cushioning member $b$ of rubber or rubber composition. Interposed between the shoe and the rim proper, which is denoted by $c$, is a mechanical device for the purpose of distributing the pressure at any point upon the shoe to all parts of the shoe around the entire rim, such mechanical device obviously playing the part of the compressed air in a pneumatic tire. This device consists, as shown in the drawings, of a plurality of links $d$ arranged in a zigzag course around the rim, each of said links being pivoted to the adjacent links, and the device as a whole being arranged to bear against the shoe upon its outer side and against the rim base upon its inner side. For this purpose, it is preferable that the device should not bear directly against the shoe on one side or directly against the rim on the other, but that bearing pieces be provided at the pivoting points of the links, that is at the vertices of the angles formed by the links on both sides of the device, the bearing pieces $e$ upon the outer side bearing against the shoe and those $f$ upon the inner side against radially adjustable plugs $g$ threaded in the rim base $c$. In this way, by providing the bearings $e$ and $f$ with elongated slots through which the pivot lugs $h$ for the links $d$ extend, the pressure distributing device will have sufficient play when pressure is brought to bear upon any one point in the shoe to permit the links to articulate upon their pivots in their effort to distribute the pressure throughout the entire rim.

The outer bearing pieces $e$, as shown, as well as the inner bearing pieces $f$ may be formed by the simplest kind of forging operation. The former consists of a single piece with its slotted ends bent over at substantially right angles to its bearing face, while the latter consists of a similar single piece (Fig. 3) in which the bearing face has been cut diagonally so as to permit the edges $i$ between the slotted upturned portions to be bent down around the head of the corresponding plug. Secured to each of the bearing pieces $f$ is a stem or rod $k$ extending into the corresponding plug between which and the bearing piece is interposed some yielding substance like a piece of rubber $l$, so that in the operation of the device the stem works slightly back and forth in the plug like a piston. It will be understood, of course, that these features are details of construction and are only suggested as possibilities in carrying out the invention. It is also preferable to inclose the pressure distributing means just described, in a suitable casing, for which a trough-shaped rim is shown (Fig. 2) being formed by securing to the rim base $c$ metallic side plates $m$ to which the tread portion of the shoe may be secured in any suitable manner. The ends of the plugs $g$ are provided with squared ends $n$ so that they may be engaged by a wrench in order to adjust the plugs, and the ends of the plugs are covered by caps $o$ which are tightly screwed down upon the rim base, a packing being provided if necessary, in order to keep moisture or dirt from entering the interior of the hollow rim.

In assembling the device, the plugs $n$ are screwed in toward the center of the wheel, the pressure distributing device is then fitted upon the plugs, and finally the shoe is secured in position upon the rim. Then the plugs are screwed outwardly until the proper tension is placed upon the shoe. It will be obvious that the plugs afford means for adjusting this tension from time to time as circumstances may require. It is understood that the radially adjustable plugs may be used with other forms of tires for the purpose of adjusting the radial pressure and also that the pressure distributing device shown herein may be used without the radial plugs, the present invention being intended to cover the separate use of these features as well as their conjoint use as described hereinbefore.

I claim as my invention:

1. A wheel having a rim, an outer tread shoe, a device including a plurality of links arranged in a continuous zig-zag course around the entire rim, bearing pieces having elongated slots, pivot pins at the vertex of each angle formed by the links engaging in said slots, and radially adjustable plugs upon which rest the bearing pieces on the inner side of said device, whereby the pressure at any point upon the shoe may be distributed to all parts of the shoe around the entire rim.

2. A wheel having a trough-shaped rim, a shoe consisting of an outer tread piece and an inner cushioning piece, a device within the rim including a plurality of links arranged in a zig-zag course around the entire rim, bearing pieces having elongated slots, pivot pins at the vertex of each angle formed by the links engaging in said slots, and radially adjustable plugs in the rim base, the bearing pieces upon the outer side of said device bearing upon the cushioning piece and those upon the inner side bearing upon the plugs, whereby the pressure at any point upon the shoe may be distributed to all parts of the shoe around the entire rim.

In testimony whereof, I have signed my name to this specification, in the presence of two subscribing witnesses.

JAMES J. ADAMSEN

Witnesses:
 JOHN W. THOMPSON,
 LUCIUS E. VARNEY.